United States Patent [19]

Monte et al.

[11] 4,199,517
[45] Apr. 22, 1980

[54] CUMYLPHENOL DERIVATIVES

[75] Inventors: Salvatore J. Monte, Staten Island, N.Y.; Gerald Sugerman, Allendale, N.J.

[73] Assignee: Kenrich Petrochemicals, Inc., Bayonne, N.J.

[21] Appl. No.: 926,267

[22] Filed: Jul. 20, 1978

Related U.S. Application Data

[63] Continuation-in-part of Ser. No. 672,425, Mar. 31, 1976, Pat. No. 4,102,862.

[51] Int. Cl.$^2$ .................... C07D 303/22; C07C 43/20; C07C 43/27; C07C 69/24
[52] U.S. Cl. ........................... 260/348.63; 260/410.5; 260/462 R; 260/966; 560/86; 560/108; 560/140; 568/640
[58] Field of Search ................ 260/348.63, 410.5, 966, 260/462 R; 560/86, 108, 140; 568/640

[56] References Cited

PUBLICATIONS

Kuznetsov et al., "Synthesis of Tris-[p-(dimethylphenylcarbinol)cresyl]phosphate", Chemical Abstracts 53, 13100f (1959).
Andreevski et al., "Dimethylphenyl-p-cresol" Chemical Abstracts 56, 7189f (1962).
Daroyskikh et al., "αα-Dimethyl-α-phenyl-p-cresol Ethers and Their Uses", Chem. Abst. 59, 8935c (1963).
Tsivunin et al., "Some Phosphorus-Containing Derivatives of Cumylphenol", Chem. Abst. 69, 106076u (1968).
Ohmichi et al., "Improving Polypropylene Resin", Chemical Abstracts 82, 17897p (1975).
Mladenov et al., "Synthesis and Application of 2--phenyl-2-(4-hydroxyphenyl)propane Ethers", Chem. Abst. 82, 44617d (1975).

*Primary Examiner*—Earl A. Nielsen
*Attorney, Agent, or Firm*—Bert J. Lewen

[57] ABSTRACT

New cumylphenol derivatives are described which are useful as reactive diluents, plasticizers and impact modifiers for polymeric materials. The derivatives include the higher alkanoic, alkenoic, aryl carboxylic and alkaryl carboxylic esters of monocarboxylic acids, the esters of polycarboxylic acids and inorganic acids, and glycidyl, alkenyl and aralkyl ethers. The borate esters of cumylphenol are particularly useful as impact modifiers with flame retardant properties.

10 Claims, No Drawings

CUMYLPHENOL DERIVATIVES

RELATED APPLICATIONS

This application is a continuation-in-part of co-pending U.S. application Ser. No. 672,425, filed Mar. 31, 1976 now U.S. Pat. No. 4,102,862, issued July 25, 1978.

BACKGROUND OF THE INVENTION

Cumylphenol and certain of its derivatives have been described in the prior art. See particularly Tsivunin et al., Biol. Akliv. Soldin. 1968, 172–5 (Russ.). Finding a use for such materials has been particularly desirable since they are readily available as by-products from commercial processes such as the making of phenol from cumene.

Similarly, it has long been desired to improve the properties of polymeric material and reactive diluents, plasticizers and impact modifiers which serve such functions at low costs have long been sought. Though numerous materials are known to satisfy these needs, they are frequently deficient because of their costs or because of incompatibility with the particular polymer.

BRIEF DESCRIPTION OF THE INVENTION

The invention concerns derivatives of cumylphenol and their use in polymeric materials. More specifically, the invention describes higher alkyl, alkenyl, aryl and alkaryl monocarboxylic acid esters of cumylphenol; polycarboxylic acid esters of cumylphenol; inorganic esters of cumylphenol; and glycidyl, alkenyl and aralkyl ethers of cumylphenol. These materials are useful as reactive diluents in epoxy, phenolic, and urethane compounds; effective as plasticizers in polyvinyl chloride, polystyrene and urethane; and useful as impact modifiers in styrene-acrylonitrile, polystyrene, phenolic and polyvinyl chloride resins. Additionally, the borate ester has flame retardant properties. While not each and every cumylphenol derivative is effective in all of the aforesaid applications, these compounds all exhibit useful properties within certain of the aforesaid fields.

DETAILED DESCRIPTION OF THE INVENTION

Cumylphenol and derivatives thereof have been found useful as reactive diluents for a variety of resins, e.g., epoxy, furan, phenolic, urethane, polyester and acrylate resins. The glycidyl ether derivative serves this function for urethane resins. The alkenoic esters are useful in polyesters and acrylates. These compounds are new compositions of matter and provide a low cost replacement for conventionally employed co-monomeric materials. In certain instances, their use improves the chemical and physical properties of the cured resins.

In still another embodiment of the invention, it has been found that esters of cumylphenol are useful as non-reactive plasticizers for polyurethanes. The benzoate and the higher acyl esters, which are unique compounds, may be used for rigid polyvinyl chloride. Here again the cost of the finished resin may be markedly reduced.

In a further embodiment of the invention, the borate, benzoyl, and glutarate esters and the benzyl and allyl ethers of cumylphenol have been found to be useful impact modifiers for polystyrene, styrene-acrylonitrile, phenolic and vinyl chloride resins.

The derivatives of cumylphenol which are useful in the invention may be represented by the following formula:

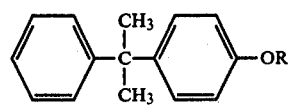

wherein R is an acyl group,

a glycidyl group having 3 to 6 carbon atoms; an alkenyl group having from 3 to 12 carbon atoms, or an aralkyl group having from 7 to 12 carbon atoms; and wherein the R' above is an alkyl group having 6 to 12 carbon atoms, alkenyl group having 2 to 12 carbon atoms, aryl group having from 6 to 12 carbon atoms or aralkyl group having from 7 to 12 carbon atoms.

When R is a glycidyl group, the preferred radical is

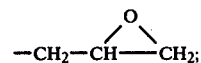

when it is an alkenyl, the preferred radicals are allyl and methallyl; and when it is aralkyl, the preferred radical is benzyl. Most preferably, R' is a phenyl, vinyl or isopropenyl group. The acetyl derivative is described by Tsivunin et al., Biol. Akliv Soldin. 1968, 172–5 (Russ.). However, the glycidyl, alkenyl and aralkyl ethers; the aryl carboxylic, alkaryl carboxylic and alkenoic esters; and the higher alkyl carboxylic esters of cumylphenol are new compositions of matter.

Still another group of derivatives are the cumylphenol esters of polyfunctional acids. The compounds may be based on both organic and inorganic acids. These materials may be readily prepared by reacting, for each mole of acid, a number of moles of cumylphenol equal to the functionality of the acid. In the case of the organic acids, these are novel compounds and may be have two or three carboxylic acid groups and from 2 to 8 additional carbon groups per molecule. Such compounds may be saturated or unsaturated, aliphatic or aromatic. Most preferred is the derivative of glutaric acid, i.e., dicumylphenyl glutarate. Other compounds include the derivatives of cinnamic acid, crotonic acid, sorbic acid, phthalic acid, isophthalic acid, terephthalic acid, maleic acid, succinic acid, fumaric acid. Half esters of these acids may also be used, in which case only sufficient cumylphenol is reacted to combine with the unesterified carboxyl group.

With respect to the esters of inorganic compounds, these include the borate, phosphite and phosphate esters. The borate esters are novel compounds.

Where the cumylphenol derivatives are used as reactive diluents, they may be present in from about 10 to about 200 parts per 100 parts of the resin, preferably from about 20 to about 50 parts.

In non-reactive plasticizer applications, from 15 to 60 wt. %, preferably from 20 to 40 wt. %, of the appropriate ester of the cumylphenol is used based on total weight of resin.

As an impact modifier, from 0.5 to 30 wt. %, preferably from 1 to 10, of the cumylphenol derivative should be used for each part of the resin in question.

In the applications of the invention where the cumylphenols are used as reactive diluents or non-reactive plasticizers, the cumylphenol compound is initially blended with the appropriate resin along with other desired components. The blend is fed to the polymerizing reactor and the resin polymerized in accordance with known techniques for the particular resin.

The resins which are cured and formed in the practice of the invention include those generically referred to as "liquid thermoset resins." By this term is meant resins which are in the liquid state under conditions of application and include casting resins, i.e., liquid monomer or incompletely polymerized polymers, usually containing catalysts or curing agents, capable of becoming hard after they are cast in molds; and coating resins, i.e., liquid monomers or incompletely polymerized polymers, optionally in a solvent or non-solvent extender, which are capable of application by casting, potting, brushing, rolling, spraying or dipping. These include paints, varnishes, enamels, lacquers, and casting and potting resins.

Of these resin, those of particular interest in the instant invention are furans, phenolics and urethanes. These may briefly be described as follows:

The furan resins are thermosetting resins obtained primarily by the condensation polymerization of furfural alcohol in the presence of a strong acid, sometimes in combination with formaldehyde or furfural. The term also includes resins made by condensing phenol with furfuryl alcohol or furfural, and furfuryl-ketone polymers.

Phenolic resins are a family of thermoset resins made by the reaction of phenols with aldehydes such as formaldehyde, acetaldehyde, or furfural in the presence of either acidic or basic catalysts. For casting, B-stage resins are generally used. Examples of the phenols are di- and trivalent phenols such as cresol, resorcinol and cardanol. In casting resin applications, a large excess of formaldehyde is generally used with sodium hydroxide as the catalyst. The reaction is usually carried out at about 64° C.

The polyurethanes are a family of resins produced by reacting diisocyanates with organic compounds containing two or more active atoms to form polymers having free isocyanate groups. A detailed description of these resins is given in U.S. Pat. No. 3,060,137, issued Oct. 23, 1962. These groups, under the influence of heat or catalyst, will react with each other or with water, glycols, etc., to form thermosetting materials.

Rigid polyvinyl chloride resins optionally contain extenders, pigments, stabilizers and a small proportion of plasticizers wherein the proportion of plasticizer is insufficient to reduce tensile modulus below about 2000 psi.

Polystyrene resins are thermoplastic resins prepared by the polymerization of high purity styrene, generally in the presence of free radical producing catalysts. They may be made by any of the conventional polymerization methods.

Styrene-acrylonitrile polymers are readily prepared by copolymerizing styrene and acrylonitrile in the presence of a free radical catalyst. See Teach, W. C., et al., "Polystyrene," Plastics Application Series, Reinhold Publishing Corp., New York, 1960.

The following examples show specific embodiments of the invention:

EXAMPLE A: Preparation of Cumylphenyl Glycidyl Ether

The cumylphenyl glycidyl ether was prepared as follows: a 3-liter flask equipped with a mechanical stirrer, thermometer, addition funnel, and external heating and cooling devices was charged sequentially with 1 liter of benzene, 1 liter of 4.5 wt. % aqueous sodium hydroxide and 1 mole of cumylphenol. The cumylphenol salt dispersion formed after mixing was cooled to 10°–15° C., mixed and maintained at 10°–15° C. during the addition of 1.1 moles of epichlorohydrin over a four hour period. After the addition of the chlorohydrin, the reaction mix was warmed to 50° C. for 8 hours. The two phases which formed were separated and the water phase discarded. The organic phase was thrice washed with cold water and the residual organic material fractionated. One hundred ninety grams (71 mole %) of a pale yellow oil having a boiling point at 5 mm Hg of 258°–263° C. was obtained. The oil had an Epoxide Number determined by $MgCl_2$-HCl titration of 3.72 meq/g, while the theoretical Epoxide Number for cumylphenol glycidyl ether is 3.73 meq/g.

The cumylphenyl glycidyl ether has the following properties:

| | |
|---|---|
| Color (Gardner) Max. | 2 |
| Specific Gravity, 77° F. (25° C.) | 1.10 |
| Wt./Gal., lbs., at 25° C. (77° F.) | 9.2 |
| Weight per Epoxide (WPE) | 286 |
| Molecular Weight | 268 |
| Viscosity, cps at 25° C. (77° F.), Max. | 120 ± 10 |
| Flash Point, COC, °F. (°C.) | 250 (121) |
| Purity, % | 96.5 |

This compound is useful as a viscosity reducing comonomer in epoxy formulations, as a heat stabilizer in vinyl resins, and as an impact modifier for phenolics.

EXAMPLE B: Preparation of Cumylphenyl Benzyl Ether

The apparatus and procedure of Example A was used, except that benzyl chloride (in place of the epichlorohydrin) was added and the temperature was maintained at 50° C. The reaction mixture was refluxed for two hours and the product recovered as described in Example 1. The yield of the benzyl either was 74 mole% and the product had a boiling point of 218° to 221° C. at 1 mm Hg.

The cumylphenyl benzyl ether has the following properties:

| | |
|---|---|
| Appearance: Waxy Solid/Heavy Liquid | |
| Specific Gravity | 1.04 |
| Wt./Gal., lbs. | 8.66 |
| Viscosity at 200° F. (93° C.), cps | 25 ± 5 |
| Flash point (COC), Min., °F. (°C.) | 350 (176) |
| Vapor Pressure (mm Hg.), Max. 200° F. (93° C.) | 1 |
| Pour Point, Max. °F. (°C.) (supercools easily) | 150 (66) |
| Minimum Assay by gas chromatograph (GC)% | 85 |

This compound is useful as an impact modifier for styrene resins, e.g., ABS and SAN, polyphenylene oxide and polyphenylene sulfide. It is also effective in making cellulose compatible with styrenic resins and styrenic resins compatible with nylon and polyester.

EXAMPLE C: Preparation of Cumylphenyl Allyl Ether

The apparatus and procedure of Example A was used to prepare the allyl ether, except that allyl chloride was used in place of the epichlorohydrin. A yield of 84 mole % was obtained. The allyl ether had a boiling point of 186° to 190° C. at 1 mm Hg.

The cumylphenyl allyl ether has the following properties:

| Appearance: Moderate Viscosity Yellow Liquid | |
|---|---|
| Specific Gravity | 1.03 |
| Wt./Gal., lbs. | 8.60 |
| Viscosity at 75° F. (24° C.), cps | 130 ± 15 |
| Flash Point (COC), Min. °F. (°C.) | 200 (93) |
| Vapor Pressure at 75° F. (24° C.); (mm Hg.) Max. | 1 |
| Pour Point, Max. °F. (°C.) | 0 (−18) |
| Min. Assay by GC, % | 85 |

This compound is useful as a reactive diluent for unsaturated polyesters and as a peroxide reactive plasticizer for vinyls and ink applications.

EXAMPLE D: Preparation of Tri(cumyl phenyl) Borate

This ester was prepared by refluxing for two hours equal molar amounts of cumylphenol with tri-n-butyl borate. About 93% of by-product butanol was then recovered by fractionation. The residue boiled at over 150° C. at 1 mm Hg. Elemental analysis showed a boron content of 1.7%, substantially the same as the calculated value.

The tri(cumyl phenyl) borate has the following properties:

| Appearance: White-tan crystalline solid | |
|---|---|
| Specific Gravity | 1.10 |
| Wt./Gal., lbs. | 9.16 |
| Viscosity at 300° F., cps | 70 ± 10 |
| Flash Point (COC), °F. (° C.), Min. | 600 (316) |
| Acid Number, Meg./100g. Max. | 0.5 |
| Melting Range, °F. (°C.) | 205–228 (96–109) |

This compound is useful as a flame retardant in resins and the like and as a plasticizer for cellulose ethers and esters.

EXAMPLE E: Preparation of Cumylphenyl Benzoate

Cumylphenyl benzoate is prepared in accordance with the following procedure: one mole of cumylphenol was dissolved in 600 ml of benzene containing 1.2 moles of triethylamine in a 2-liter stirred glass reactor equipped with external heating and cooling devices. The reaction mass was cooled to and maintained at 15°–20° C. during the addition of 1.1 moles of benzoyl chloride over a period of 1.5 hours. After completion of addition, the resulting slurry was heated to and maintained at 40°–45° C. for 1 hour, and thereafter cooled to ambient temperature and filtered. The filter cake was washed with 200 ml of toluene and the combined washings and filtrate distilled to give 214.9 g (68 mole %) of a pale yellow oil having a boiling point at 0.5 mm Hg of 261°–265° C., a specific gravity at 55° C. of 1.082, and a viscosity at 55° C. of 215 cps. On standing, the oil solidified to form a white solid having a melting point of 43°–46.5° C.

The cumylphenyl benzoate has the following properties:

| Color (Gardner), Max. | 4 |
|---|---|
| Specific Gravity | 1.13 |
| Wt./Gal., lbs. | 9.4 |
| Viscosity at 100° C. (212° F.), cps | 15 |
| Flash Point, COC, Min., °F. (°C.) | 450 (232) |
| Hydroxyl Number, Meg./100g (Max.) | 0.2 |
| Acid Number, Meg./100g (Max.) | 0.2 |
| Saponification Value | 188 |
| Pour Point (Supercools easily), °F. (°C.) | 140 (60) |

This compound is useful as a process aid, i.e., melt index improver, for rigid vinyl systems and thermoplastic polyesters and for reaction injection molded urethanes, particularly where high mineral filler loadings are employed.

EXAMPLE F: Preparation of Dicumylphenyl Glutarate

This compound was prepared by reacting 1 mole of dimethyl glutarate with 2 l moles of cumylphenyl acetate in the presence of 0.5 wt. % of sulfuric acid as catalyst. During the reaction, acetic acid was distilled overhead until the bottoms product boiled over 150° C. at 1 mm Hg. Thereafter, the product was neutralized with calcium carbonate, filtered and recrystallized from toluene. The product obtained was a hard, white, waxy solid. The yield was 83% of theory.

The dicumylphenyl glutarate has the following properties:

| Appearance: Hard White Wax | |
|---|---|
| Specific Gravity | 1.13 |
| Wt./Gal., lbs. | 9.41 |
| Viscosity at 350° F. (176° C.), cps | 140 ± 15 |
| Flash Point (COC), Min. °F. (°C.) | 700 (371) |
| Vapor Pressure (mm Hg.), Max. 200° F. (93° C.) | 1 |
| Melting Range, °F. (°C.) | 250–280 (121–138) |
| Acid Number, Meq./100g Max. | 0.5 |

This compound is useful as a process aid in polyacrylate and polyacrylonitrile extrusion and molding operations.

EXAMPLE G: Preparation of Cumylphenyl Acrylate

Cumylphenyl acrylate was prepared in the apparatus described in Example A. One mole of cumylphenol and 2 moles of calcium carbonate were slurried in the presence of 1 liter of toluene solvent. During a period of 2 hours, one mole of acryl chloride was added to the solution while the temperature was maintained at 40° to 50° C. The reaction mixture was filtered and the filtrate distilled at 5 mm Hg. to produce a pale yellow oil boiling at 198° to 203° C. The yield was 84%. Gas chromatographic assay indicated that less than 3% of unreacted cumyl phenol was retained in the product.

The cumylphenyl acrylate has the following properties:

| Appearance: Pale Yellow Oil | |
|---|---|
| Specific Gravity | 1.07 |
| Wt./Gal., lbs. | 8.91 |
| Viscosity at 75° F. (24° C.), cps | 105 ± 10 |

| | |
|---|---|
| Flash Point (COC), min. °F. (°C.) | 300 (150) |
| Vapor Pressure at 75° F. (24° C.)(mm Hg) | 1 |
| Acid Number, Meq. 1100g. Max. | 0.5 |
| Pour Point, Max. °F. (°C.) | 0 (−18) |

This compound is useful as a co-monomer in peroxide cured acrylates, polyesters and alkyl resin formulations. It also imparts greater impact strength and higher curing rates as compared with conventional co-monomers, e.g., phenyl acrylate.

EXAMPLE H: Preparation of Cumylphenyl Methacrylate

The methacrylate ester was prepared by the procedure described in Example G, except that methacryl chloride was used in place of acryl chloride. The yield was 84%.

The cumylphenyl methacrylate has the following properties:

| | |
|---|---|
| Appearance: Pale Yellow Oil | |
| Specific Gravity | 1.06 |
| Wt./Gal., lbs. | 8.83 |
| Viscosity at 75° F. (24° C.), cps | 110 ± 15 |
| Flash Point (COC), Min. °F. (°C.) | 330 (149) |
| Boiling Range, °F. (°C.) at 5 mm | 415–431 (213–222) |
| Acid Number, Meq./100g. max. | 0.5 |
| Pour Point, Max °F. (°C.) | 18 (−8) |

This compound is useful for the same application as the cumylphenyl acrylate. It is often superior, however, in enhancing impact strength, but it does not as effectively enhance the cure rate.

EXAMPLE I: Preparation of Cumylphenyl 2-ethylhexanoate

Cumylphenyl 2-ethylhexanoate was prepared in accordance with the following procedure: a 2-liter flask equipped with a mechanical agitator, a ten theoretical plate fractionating column, an automatic reflux splitter pot, vapor thermo-controllers, a condenser, receivers, and external heating and cooling devices, was charged with 2 moles of cumylphenyl acetate, 5 moles of 2-ethylhexanoic acid and 5 grams of 98% sulfuric acid. Heat was supplied externally and the distillate was collected at a 20:1 reflux ratio at a vapor temperature below 120° C. at atmospheric pressure. A total of 64 cc of distillate was collected in 24 hours. The residual pot contents were cooled to ambient temperature and extracted 5 times with 2 l. of 8% sodium bicarbonate dried over anhydrous $Na_2SO_4$ and fractionated to give 448 g. (58 mole %) of a pale yellowish oil. The oil had a boiling point at 0.2 mm Hg of 252°–257° C., a specific gravity 20/20 of 1.045 and a saponification value of 2.82 meq/g. The cumylphenyl 2-ethylhexanoate ester has a theoretical saponification value of 2.85 meq/g.

EXAMPLE J: Preparation of Cumylphenyl Phosphite

Three moles of cumyl phenol dissolved in 2 l. of toluene were treated at 75°–80° C. with 1 mole of phosphorus trichloride. The resulting by-product HCl gas was scrubbed with standard 1 M. aqueous NaOH. The HCl recovery was 96% of theory. The crude reaction product was crystallized on cooling and, after standing overnight, was recrystallized from petroleum ether (b.p. 40°–60° C.) to yield 582 g. (87 mole % yield) of beige leaflets m.p. 69°–71° C. This product may be used as an antioxidant or antiozonant.

EXAMPLE K: Preparation of Cumylphenyl Phosphate

The phosphorus trichloride utilized in the above example was replaced by 1 mole of phosphorus oxychloride to prepare the cumylphenyl phosphate. The HCl by-product recovery was 93% of theory. Using dioxane as the recrystallization solvent, a yield of 561 g. of white plate-like crystals were obtained having a m.p. of 128°–131° C. (82 mole%). The product may be used as a process aid (melt index improver) and impact modifier for rigid vinyl in place of triphenyl phosphate which is now used commercially.

EXAMPLE 1

This example shows the effect of cumylphenol and its derivatives on the physical properties of epoxy resins. Formulations were prepared using Epon 828 (average viscosity, 16,000 centipoise) epoxy resins, 100 parts; triethylenetetramine as a curative, 12 parts; and Berkley #1 sand in amounts shown in the following table; and with cumylphenol and its acetate and glycidyl ether derivatives. The compressive strength and the tensile strength of compositions, cured at ambient temperature, were measured after five days. The following table shows the formulations and the results obtained:

Table I

| Additive | Parts by Weight | Epoxy | Sand | Compressive Strength, psi M | Tensile Strength, psi M |
|---|---|---|---|---|---|
| None | — | 88 | 200 | 12.0 | 0.9 |
| None | — | 88 | 250 | 10.9 | 0.76 |
| None | — | 88 | 300 | 9.5 | 0.71 |
| None | — | 88 | 350 | NP | NP |
| Cumylphenol | 22 | 66 | 200 | 17.3 | 1.2 |
| Cumylphenol | 22 | 66 | 250 | 16.9 | 1.0 |
| Cumylphenol | 22 | 66 | 300 | 16.5 | 0.91 |
| Cumylphenol | 22 | 66 | 350 | 15.8 | 0.82 |
| Cumylphenol | 22 | 66 | 400 | NP | NP |
| Cumylphenyl Acetate | 22 | 66 | 200 | 19.4 | 1.65 |
| Cumylphenyl Acetate | 22 | 66 | 250 | 18.1 | 1.51 |
| Cumylphenyl Acetate | 22 | 66 | 300 | 17.3 | 1.38 |
| Cumylphenyl Acetate | 22 | 66 | 400 | 14.8 | 1.16 |
| Cumylphenyl Acetate | 22 | 66 | 450 | 12.1 | 0.94 |
| Cumylphenyl Acetate | 22 | 66 | 500 | NP | NP |
| Cumylphenyl Glycidyl Ether | 22 | 66 | 200 | 14.6 | 1.08 |
| Cumylphenyl Glycidyl Ether | 22 | 66 | 250 | 13.7 | 0.98 |
| Cumylphenyl Glycidyl Ether | 22 | 66 | 300 | 12.1 | 0.92 |
| Cumylphenyl Glycidyl Ether | 22 | 66 | 400 | 9.9 | 0.83 |
| Cumylphenyl Glycidyl Ether | 22 | 66 | 450 | NP | NP |

NP = non-pourable

The above table clearly shows that the compressive strength and the tensile strength are markedly improved by substituting the cumylphenyl or its derivatives for a portion of the epoxy composition. The table further shows that 400, 500 and 450 parts of sand were added in the cases of the cumylphenol, the cumylphenyl acetate and the cumylphenyl glycidyl ether, respectively, before the non-pourable condition occurred. This shows that the additives of the invention all have an effect of reducing the viscosity of the mixture. This is of great advantage, since it permits higher loading the lower cost compositions.

EXAMPLE 2

This example shows the use of cumylphenyl glycidyl ether as a reactive diluent for polyurethane.

Five polyurethane compositions containing 100 parts by weight of polyurethane (Adiprene CM, trademark of E. I. DuPont deNemours & Co.), a reaction product of diisocyanate and polyalkylene ether glycol, 30 parts of HAF carbon black, 1 part of mercaptobenzothiazole, 4 parts of 2,2'-benzothiazyl disulfide, 0.5 part of zinc chloride-2,2'-benzothiazyl disulfide, 0.75 part of sulfur and 0.5 part of cadmium stearate were prepared. The first formulation contained no plasticizer or reactive diluent. Second, third and fourth formulations were also prepared, these containing dioctyl phthalate (DOP), doctyl sebecate (DOS) and a heavy aromatic naphtha oil diluent (Sundex 790, a trademark of Sun Oil Company), respectively. The first two of these materials are conventionally known non-reactive plasticizers, while the fourth is a reactive plasticizer. To a fifth formulation, 15 parts by weight of the cumylphenyl glycidyl ether (CGE) of the invention was added. The compositions were cured for 60 minutes at 140° C., and the physical properties tested. The results are shown in the following table:

Table II

|  | 1 | 2 | 3 | 4 | 5 |
|---|---|---|---|---|---|
| Plasticizer | None | DOP | DOS | Naphtha | CGE |
| 300% Modulus psi | 2850 | 1900 | 1750 | 1700 | 1810 |
| Tensile psi | 4050 | 3800 | 3550 | 4550 | 5200 |
| Elongation at Break % | 420 | 470 | 460 | 540 | 530 |
| Hardness Durometer A | 70 | 62 | 61 | 62 | 67 |

The above data clearly show that the cumylphenyl glycidyl ether of the invention was effective in reducing the modulus of the polyurethane formulation. They further show that it is substantially better than the other plasticizers, since the cured composition has a much better tensile strength and, of the compositions tested, there is the least loss of hardness. This combination of properties is particularly useful, as will be readily recognized by one skilled in the art, and most surprising and unexpected. Furthermore, even in the case of the naphtha oil, the other reactive diluent, the tensile strength was much better. This may be attributable to the glycidyl ether improving the cure.

EXAMPLE 3

This example shows the utility of p-cumylphenyl benzoate as a processing aid and lubricant for the extrusion of rigid PVC.

The following formulations were premixed in a high intensity mixer (Disona) and ambient temperature and extruded through a standard type 4" pipe die at 180°±10° C., at a fixed power input. The physical properties of the extrudate and the rate of extrusion are also shown in the table below:

Table III

| Formulations | 1 | 2 |
|---|---|---|
| PVC resin* | 100 | 100 |
| Triphenyl phosphite (stabilizer) | 0.5 | 0.5 |
| Diphenyl phthalate (processing aid) | 1.0 | — |

Table III-continued

| Formulations | 1 | 2 |
|---|---|---|
| Calcium stearate | 1.0 | 1.0 |
| Oxidized polyethylene (Allied Chemical Corp. AC 629A) | 0.2 | — |
| Wax (Hoechst XL165) | 1.0 | 2.2 |
| Cumylphenyl benzoate | — | 1.0 |
| Extrusion Rate, inches/min. | 8" | 10.4" |
| Impact Strength, psi | 205 | 210 |
| Flexural Strength, psi | 16.2M | 19.1M |

*VC 100, Bordon Chemical trademark for alow to medium molecular weight resin.

The addition of the benzoate ester resulted in a 24% extrusion rate improvement and an 18% flex strength improvement, without any sacrifice of impact strength. Other experiments show that the benzoate ester is unique in this regard and that similar improvements do not result from other cumylphenol derivatives.

EXAMPLE 4

To show the efficacy of the 2-ethylhexanoate ester as a plasticizer for flexible polyvinyl chloride, 100 parts of a medium molecular weight PVC resin were admixed with 40 parts by weight of 5 micron calcium carbonate, and 2 parts by weight of Thermogard S stabilizer (a trademark of M & T Chemicals, Inc.). Three formulations were prepared. The first contained 30 parts by weight of triethylene glycol dibenzoate (TGD), the second 30 parts by weight of dioctyl phthalate (DOP), and the third 30 parts by weight of the cumylphenyl 2-ethylhexanoate (CPE) of the invention. The following table shows the physical properties of the blend after cure:

Table IV

|  | 1 | 2 | 3 |
|---|---|---|---|
| Plasticizer | TGD | DOP | CPE |
| Hardness Shore A Scale | 76 | 75 | 76 |
| 100% Modulus | 1550 | 1320 | 1350 |
| Tensile Strength, psi | 2350 | 1890 | 2510 |
| % Elongation | 290 | 310 | 340 |

The above table clearly shows that the compound of the invention effectively reduces the modulus of the formulation. In comparison to the other plasticizers, the 2-ethylhexanoate ester-containing formulation has the best tensile strength and percent elongation.

EXAMPLE 5

In this example an acrylonitrile-styrene copolymer (Bakelite RMD 4420, a trademark of Union Carbide Corp.) was admixed with 3 parts per 100 parts by weight of the cumylphenol derivative shown in the table below. The elongation, tensile strength, and notched Izod impact strength obtained in each case was compared with the acrylonitrile composition control.

Table V

| Additive | Elongation % | Tensile Strength psi | Notched Izod Impact Strength ft.lb./in. |
|---|---|---|---|
| None | 2.3 | 10,000 | 0.45 |
| Cumylphenyl benzoate | 5.5 | 11,200 | 0.85 |
| Cumylphenyl borate | 2.8 | 13,500 | 0.60 |
| Cumylphenyl glutarate | 3.2 | 10,500 | 0.60 |
| Cumylphenyl |  |  |  |

Table V-continued

| Additive | Elongation % | Tensile Strength psi | Notched Izod Impact Strength ft.lb./in. |
|---|---|---|---|
| benzyl ether | 7.4 | 12,800 | 0.90 |

The above table shows that each of the cumylphenol derivatives evaluated increased the elongation, tensile strength and impact strength of the acrylonitrile-styrene copolymer. The benzoate ester and the benzyl ether were the most effective in enhancing elongation while the borate ester improved the tensile strength by about 35%. Impact strength was improved in all cases with the greatest increase being shown with the benzoate ester and the benzyl ether.

EXAMPLE 6

In this example, 100 parts of polystyrene (Dylene, a trademark of Arco Chemical Company) were admixed in a drum tumbler with 2 parts of the cumylphenol derivative shown in the following table. Input samples were prepared by profile extrusion at 375° F. in a non-vented Hartig extruder using a general purpose mixing screw, L/D ratio of 24:1.

The following Table shows the results obtained:

Table VI

| Additive | Ultimate Elongation, % | Tensile Strength psi | Notched Izod Impact Strength ft.lb./in. |
|---|---|---|---|
| None | 1.8 | 6,700 | 0.35 |
| Cumylphenyl benzyl ether | 5.2 | 8,600 | 0.80 |
| Cumylphenyl allyl ether | 3.1 | 7,400 | 0.55 |

The above table clearly shows that the elongation, tensile strength, and notched impact strength are improved by the addition of the cumylphenol derivatives. The benzyl ether is the most outstanding in improving the physical properties.

EXAMPLE 7

In this example, the effect of the cumylphenol derivatives on the tensile and impact strength of unfilled phenolic resins is shown. The resin used was a Bakelite Resin 2620 (trademark of Union Carbide Corp.). For each 100 parts of resin, 3 parts of additive (shown in the table below) along with 0.2 parts of p-toluenesulfonic acid were admixed in a high shear Cowles mixer at 140° to 160° F. The material was thereafter cast into test specimens, 6"×¼"×¼", in a Teflon coated steel mold and cured at 300° F. for 2 hours.

Table VII

| Additive | Notched Izod Impact ft.lb./in. | Tensile Strength, psi |
|---|---|---|
| None | 0.55 | 7,200 |
| Cumylphenyl borate | 0.62 | 8,900 |
| Cumylphenyl benzoate | 0.85 | 7,500 |
| Cumylphenyl benzyl ether | 1.05 | 7,400 |

The above data clearly show that the borate ester against greatly improves the tensile strength of the resin. Smaller improvements are shown with the cumyl phenyl benzoate and the benzyl ether; however, the benzyl ether has a substantial effect on the impact strength, almost doubling the value achieved. This is particularly significant, since impact strength is improved without sacrificing tensile strength.

EXAMPLE 8

In this example, 100 parts of an unfilled polyvinyl chloride resin Bakelite QSAP-7 (a trademark of Union Carbide Corp.) was compounded at a temperature of 300° F. in a twin screw Anger extruder (L/D=24:1) with 2 parts of microcrystalline wax, 1 part of calcium stearate, 1 part of lead diphthalate, and 3 parts of the cumylphenyl derivative shown in the following table. The extruder has a PVC screw and X-alloy coated barrel. Prior to extrusion the components were blended in a Wellex high shear mixer. Test samples were profile extruded at a temperature of 300° F. into ¼" square rods and cut into pieces 6" long. The following results were obtained:

Table VIII

| Additive | Notched Izod Impact ft.lb./in. | Tensile Strength, psi |
|---|---|---|
| None | 0.65 | 5,800 |
| Cumylphenyl benzoate | 0.90 | 6,300 |
| Cumylphenyl borate | 0.85 | 5,900 |
| Cumylphenyl benzyl ether | 1.15 | 7,400 |
| Dicumylphenyl glutarate | 1.05 | 7,200 |

The above table shows that the cumylphenol derivatives improved the notched Izod impact without lessening the tensile strength of the unfilled polyvinyl chloride. The benzyl ether and the glutarate ester were particularly outstanding since not only did they result in the greatest improvement in impact strength, but they also gave the greatest improvement in tensile strength. These additives did not affect the clarity of the polyvinyl chloride, though the material became a light tan color.

What is claimed is:

1. Cumylphenol derivatives having the following formula:

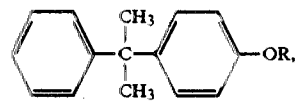

wherein R is an acyl group having the formula, —CO—R'; a glycidyl group having from 3 to 6 carbon atoms; an alkenyl group having from 3 to 12 carbon atoms, or an aralkyl group having from 7 to 12 carbon atoms; and wherein R' is an alkyl group having from 6 to 12 carbon atoms, an alkenyl group having 2 to 12 carbon atoms, an aryl group having from 6 to 12 carbon atoms, or an aralkyl group having from 7 to 12 carbon atoms.

2. A cumylphenol derivative having the following formula:

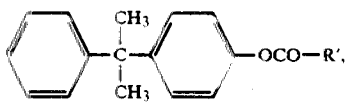

wherein R' is a phenyl group, a vinyl group, or an isopropenyl group.

3. A cumylphenol derivative having the following formula:

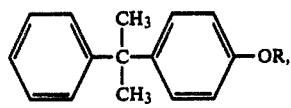

wherein R is an allyl, methallyl, benzyl or glycidyl group.

4. A cumylphenol ester of boric acid.

5. A cumylphenol ester of an organic dicarboxylic acid having from 4 to 8 carbon atoms per molecule.

6. The compound of claim 5 wherein the dicarboxylic acid is unsaturated or aromatic.

7. The compound of claim 5 wherein the dicarboxylic acid is glutaric acid.

8. Cumylphenyl glycidyl ether.

9. Cumylphenyl benzoate.

10. An alkanoic acid ester of cumylphenol wherein the alkyl moiety of the alkanoic acid has 6 to 10 carbon atoms.

* * * * *